United States Patent [19]

Nissen et al.

[11] Patent Number: 4,469,653

[45] Date of Patent: Sep. 4, 1984

[54] PROCESS FOR THE PREPARATION OF MOLDED PARTS OF POLYURETHANE OR POLYURETHANE-POLYUREA EMPLOYING MONOCYCLIC AMIDINES

[75] Inventors: Dietmar Nissen, Heidelberg; Eckhard Hickmann, Dannstadt-Schauernheim, both of Fed. Rep. of Germany

[73] Assignee: BASF Aktiengesellschaft, Ludwigshafen, Fed. Rep. of Germany

[21] Appl. No.: 393,052

[22] Filed: Jun. 28, 1982

[30] Foreign Application Priority Data

Jul. 4, 1981 [DE] Fed. Rep. of Germany ....... 3126436

[51] Int. Cl.³ .................... B29D 27/00; C08G 18/20; C08J 9/04; C08K 5/34
[52] U.S. Cl. ....................................... 264/51; 264/53; 264/54; 264/328.6; 264/DIG. 83; 521/129; 528/53
[58] Field of Search ................... 264/DIG. 83, 53, 54, 264/51, 328.6; 521/129; 528/53

[56] References Cited

U.S. PATENT DOCUMENTS

| | | | |
|---|---|---|---|
| 3,099,516 | 7/1963 | Henrickson | 264/48 |
| 3,304,273 | 2/1967 | Stamberger | |
| 3,383,351 | 5/1968 | Stamberger | |
| 3,394,164 | 7/1968 | McClellan et al. | |
| 3,523,093 | 8/1970 | Stamberger | |
| 3,567,765 | 3/1971 | Thiele | |
| 3,769,244 | 10/1973 | Hashimoto et al. | |
| 3,814,707 | 6/1974 | Möller et al. | 521/129 |
| 3,912,689 | 10/1975 | Bechara et al. | 521/129 X |
| 4,006,124 | 2/1977 | Welte et al. | |
| 4,041,019 | 8/1977 | McGraw et al. | 528/53 |
| 4,189,543 | 2/1980 | Doorakian et al. | 528/53 X |
| 4,242,467 | 12/1980 | Zimmerman | 521/129 |

FOREIGN PATENT DOCUMENTS

| | | |
|---|---|---|
| 889050 | 2/1962 | United Kingdom |
| 965474 | 7/1964 | United Kingdom |
| 987618 | 3/1965 | United Kingdom |
| 994890 | 6/1965 | United Kingdom |
| 1040452 | 8/1966 | United Kingdom |
| 1072956 | 6/1967 | United Kingdom |
| 1287150 | 8/1972 | United Kingdom |
| 1534258 | 11/1978 | United Kingdom |

OTHER PUBLICATIONS

Knipp, Ulrich "Plastics for Automobile Safety Bumpers," in *Journal of Cellular Plastics,* vol. 9, No. 2, Mar.-/Apr. 1973, pp. 76–84.

Prepelka, David J. and James L. Wharton "Reaction Injection Molding in the Automotive Industry," in *Journal of Cellular Plastics,* vol. 11, No. 2, Mar./Apr. 1975, pp. 87–98.

*Primary Examiner*—Philip E. Anderson
*Attorney, Agent, or Firm*—Norbert M. Lisicki

[57] ABSTRACT

The invention relates to a process for the preparation of polyurethane or polyurethane-polyurea molded parts by reacting organic polyisocyanates, polyols and chain extenders in the presence of monocyclic amidines having the formula

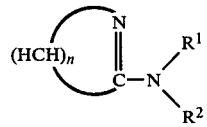

as catalyst or catalyst mixtures of monocyclic amidines having the formula (I) and (a) tertiary amines, (b) metal salts having the formula Me $X_nY_m$ (II), and/or (c) optionally-substituted aliphatic carboxylic acids. $R^1$ and $R^2$, Me, X, Y, n, and m are defined herein.

10 Claims, No Drawings

PROCESS FOR THE PREPARATION OF MOLDED PARTS OF POLYURETHANE OR POLYURETHANE-POLYUREA EMPLOYING MONOCYCLIC AMIDINES

BACKGROUND OF THE INVENTION

1. Field of the Invention

The present invention relates to the preparation of polyurethanes or polyurethane-polyureas. More particularly the invention relates to the use of certain monocyclic amidines as catalysts for the urethane/urea reactions.

2. Description of the Prior Art

The preparation of crosslinked plastic substances according to the isocyanate polyaddition method is known. According to German Application No. 11 96 864 (U.S. Pat. No. 3,099,516), hydroxyl group-containing compounds and polyisocyanates are reacted for this purpose in the presence of blowing agents and catalysts. With suitable selection of the hydroxyl group-containing polyesters, polyethers, polyether esters, polyester amides and others, and organic polyisocyanates, as well as by the additional use of chain extenders, such as glycols or diamines, flexible as well as rigid polyurethane elastomers, as well as all intermediate modifications, may be prepared according to this method.

One method for the preparation of cellular molded parts with a closed surface layer of polyurethane-polyurea elastomers according to the principle of reaction injection molding is described in German Published Application No. 26 22 951 (British Pat. No. 1,534,258). The elastomer systems basically consist of organic polyisocyanates, polyols, active aromatic di- and/or polyamines which may be substituted by alkyl groups in the ortho position to the amino group and catalysts for the reaction between hydroxyl and isocyanate groups. Such systems have cream times down to less than one second. The transition from liquid into the solid phase takes place nearly instantaneously resulting in the liquid reaction mixture solidifying along the walls of the mold.

According to German Patent Application No. P 29 40 738.9, polyurethane-polyurea formulations with somewhat reduced reactivity, and thereby flowability, are obtained if 3,3',5,5'-tetra-alkyl-substituted 4,4'-diamino diphenylmethanes are used as aromatic diamines in which the alkyl radicals are the same or different and stand for a methyl, ethyl, isopropyl, secondary or tertiary butyl radical, with at least one of these substituents having to be an isopropyl or secondary butyl radical.

Further known is the use of amidines, mono- and bicyclic amidines as polyurethane catalysts. According to information in German Published Application No. 1,950,262 (Great Britian No. 1,287,150), amidines, for example, N'-cyclohexyl-N,N-dimethylformamide, are used as catalysts for the preparation of polyurethane foams from aliphatic diisocyanates. The same published application described monocyclic amidines, for instance, 3-butyl-3,4,5,6-tetrahydropyrimidine. Commonly used polyurethane catalysts are also substituted imidazoles and dialkylamino pyridines. Bicyclic amidines as urethane catalysts are described in German Published Application No. 1,745,418 (U.S. Pat. No. 3,769,244) where the use of metal organic compounds is also mentioned.

Amidines frequently have the drawback that they are easily decomposed by water (*Methods of Organic Chemistry*, Houben-Weyl, Vol XVI/1, page 940, 4th Edition, G. Thieme, publishers Stuttgart, 1957). This largely prevents their use in water-containing systems. However, even the small amounts of water present in polyols normally suffice for greatly reducing the catalytic effects of free amidines within a short period of time. It is therefore not possible to store amidine-containing polyol mixtures.

Moreover, the use of free amidines is not only greatly restricted by water but also by halogenated hydrocarbons. These quickly react by quaternising, resulting in a loss in catalytic effect of the amidines.

In order to eliminate these drawbacks, amidine-metal complexes are described in German Published Application No. 24 34 185 (U.S. Pat. No. 4,006,124). As illustrated in the German Application, the complexes must be prepared in a separate process step prior to being added to the polyol since the addition of the individual components to the polyol brings about considerably poor results.

The purpose of this invention was the development of catalysts facilitating a pronounced acceleration of the polyaddition reaction of hydroxyl group-containing compounds with isocyanates and which overcome the above-mentioned drawbacks.

SUMMARY OF THE INVENTION

The present invention relates to a process for the preparation of polyurethane or polyurethane-polyurea molded parts by reacting organic polyisocyanates, polyols and chain extenders in the presence of catalysts, optionally in the presence of blowing agents, auxiliaries and additives, employing as catalyst a monocyclic amidine having the formula

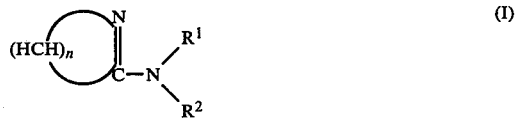 (I)

wherein
R$^1$ is hydrogen or R$^2$;
n represents a whole number from 3 to 12, preferably 3 to 5, and particularly 5.
R$^2$ is a linear or branched alkyl radical having 1 to 20 carbon atoms, preferably a branched alkyl radical with 1 to 14 carbon atoms, a linear or branched OH—, —NH$_2$, —NH— and/or SH-group-containing alkyl radical with 1 to 20 carbon atoms, a cycloalkyl radical with 5 to 12, preferably 5 to 6, carbon atoms, in which one or more, preferably 1 to 3, methylene groups may be substituted by —O—, —S—, —NH—, —CO— bridge members, a cycloalkyl radical with 5 to 12, preferably 5 to 6, carbon atoms substituted with linear or branched alkyl groups with 1 to 6 carbon atoms, a cyclohexyl radical, OH—, —NH$_2$ or SH-groups wherein one or more methylene groups can be substituted by —OH—, —S— or NH— members, an aromatic radical with 6 to 15, preferably 6 carbon atoms, an aromatic radical with 6 to 15 carbon atoms, preferably 6 carbon atoms, substituted with linear or branched alkyl groups with 1 to 6, preferably 1 to 3, carbon atoms, OH—, —NH$_2$, —NHCH$_3$, N(CH$_3$)$_2$— or SH-groups, an aralkyl radical with 7 to 11, preferably 7 to 8, carbon atoms wherein the radicals $R^1$ and $R^2$ are the same or different, or wherein together form a ring with 4 to 12, preferably 4 to 7, carbon atoms, in which one or more methylene groups may be substituted by —O—, —S—, —NH—, —CO-bridge members, preferably —NH— and/or —O— bridge members, and which optionally contain linear or branched alkyl radicals with 1 to 6 carbon atoms, preferably 1 to 4 carbon atoms, or carboxylate groups is acid ester groups in bonded form as substituents, and in which n denotes a whole numer from 3 to 12, preferably 3 to 5.

DESCRIPTION OF THE PREFERRED EMBODIMENTS

The monocyclic amidines to be used in accordance with this invention may be used individually or in the form of mixtures. According to a preferred version, the monocyclic amidines are used together with cocatalysts such as (a) tertiary amines,
(b) metal compounds having the formula $$MeX_nY_m \quad (II)$$

in which
Me is a (n+m)-functional metal, preferably a metal of the Ist, IInd, VIIth, or VIIIth secondary group or the IVth main group of the periodic systems of the chemical elements,
X is an aliphatic hydrocarbon radical with 1 to 18 carbon atoms, an aromatic hydrocarbon radical with 6 to 10 carbon atoms, or an araliphatic hydrocarbon radical with 7 to 15 carbon atoms,
Y represents one optionally olefinic double bond and/or alcoholic hydroxyl group-containing aliphatic, simply negatively charged carboxylate ion with 2 to 8 carbon atoms, or a simply negatively charged enolate anion with 5 to 18 carbon atoms, and
n is 0 to 2,
m is 0 to 4 with the restriction that the total n+m results in 2 to 4 and (c) optionally olefinically unsaturated double bond and/or hydroxyl group-containing aliphatic carboxylate acid with 2 to 18 carbon atoms or mixtures of at least two of the above-described cocatalysts.

If mixtures of the monocyclic amidines of Formula (I) and metal compounds (b) of Formula (II) or aliphatic carboxylic acids (c) are used as catalysts, they are used in mole ratios of amidine to metal compound and/or aliphatic carboxylic acid of 0.5 to 5:1, preferably 1 to 3:1.

The monocyclic amidines of Formula (I) alone or in combination with metal compounds (b) of Formula (II) cause a pronounced catalytic acceleration of the polyaddition of isocyanate and hydroxyl groups. Surprisingly it is completely immaterial whether or not complex compounds are produced in a separate step prior to the addition to the polyol, or if the components are incorporated in the polyol individually. This holds particularly true for crystalline amidines which are prepared together with the solid or liquid metal compounds (b) or are dissolved separately in the polyol.

Surprisingly, the amount of, for instance, tin catalyst, can be reduced by the factor 2 to 4 when combinations of monocyclic amidines and metal compounds (b) are used in highly reactive polyurethane-polyurea reaction injection molding systems based on primary aromatic diamines. This is all the more remarkable since relatively large amounts of metal organic catalysts are used for such systems in order to accelerate the reaction of the hydroxyl groups with the isocyanate groups to such an extent that it reaches approximately the speed of amino with isocyanate groups. Such high contents of metal organic compounds impair the heat aging resistance of materials produced in this manner.

If, on the other hand, monocyclic amidines with a correspondingly lower amount of metal compounds (b) are used, polyurethane-polyurea molded parts are obtained with excellent heat-aging resistance, particularly at temperatures above 130° C.

Surprisingly, the monocyclic amidines are not only stable with respect to hydrolysis, but also with respect to aminolysis, so that mixtures of polyols and aromatic diamines, as they are normally processed in accordance with reaction injection molding techniques, are storable.

Another advantage is the fact that the monocyclic amidines usually only have a weak, and in part, a pleasant aromatic odor, or, as a result of substituents which are reactive with isocyanate, are firmly incorporated in the polyaddition product and thus result in odorless materials. The monocyclic amidines which cannot be incorporated are of such low volatility that migration phenomenon, as it is known with respect to many tertiary amines, is not incurred.

The greatest catalytic effect is developed by the monocyclic amidines when they are not only used in combination with metal compounds (b), but also in combination with tertiary amines (a).

The monocyclic amidines, however, not only have the above-mentioned advantageous properties, but they are also suited as a component for so-called delayed catalysts. Catalyst systems with a delaying effect are obtained by combining the monocyclic amidines with aliphatic carboxylic acids (c). It is inconsequential as to whether the monocyclic amidine salts are produced separately or are formed in the polyol in situ. Their effect is to essentially uninfluence rise time and/or the demold time of molded parts of polyurethane-polyures whereas the pot time is considerably shortened.

The monocyclic amidines to be used in accordance with this invention may be produced, for instance, in accordance with the instructions put forth in "*Methods of Organic Chemistry*," Houben-Weyl, Vol. XI/2, page 57, 4th Edition, G. Thieme Publishers, Stuttgart, 1958.

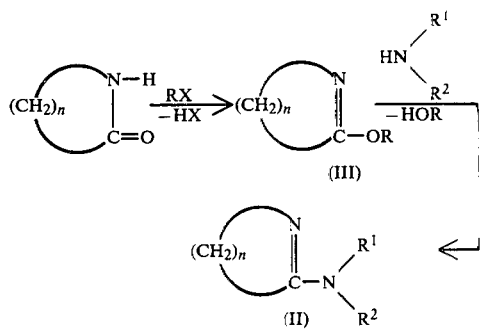

Ethers having formula

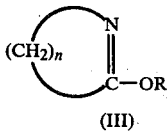

are used as starting material in the preparation of the monocyclic amidines. In this formula R is an alkyl radical with 1 or 2 carbon atoms, preferably a methyl radical, and n represents a whole number from 3 to 12, preferably 3 to 5, and particularly 5. The examples for lactin ethers include 2-methoxy-3,4-dihydro-5H-azole, 2-ethoxy-3,4-dihydro-5H-azole, 2-methoxy-3,4,5,6-tetrahydroazine, 2-ethoxy-3,4,5,6-tetrahydroazine, 2-methoxy-3,4,5,6-tetrahydro-7H-azepine, 2-ethoxy-3,4,5,6-tetrahydro-7H-azepine, 2-methoxy-3,4,5,6,7,8-hexahydroazamine, 2-ethoxy-3,4,5,6,7,8,-hexahydroazamine, 1-aza-2-methoxy-cyclododeca-1-ene, 1-aza-2-ethoxy-cyclododeca-1-ene. Preferably used are 2-methoxy-3,4-dihydro-5H-azole, 2-ethoxy-3,4,5,6-tetrahydro-7H-azepine, and particularly 2-methoxy-3,4,5,6-tetrahydro-7H-azepine.

Examples of other starting materials include primary and secondary, unsubstituted and substituted alkylamines, with 1 to 20 carbon atoms, such as methyl-, n-propyl-, isopropyl-, butyl-, isobutyl-, secondary butyl-, isopentyl-, hexyl-, octyl-, 2-ethyl-hexyl-, diisopropyl-, dihexyl-, ethyl-propyl- and 2-dimethyl-amino ethyl-amine, 1,2-propanediamine, 1,4-diaminobutane and preferably ethanolamine, diethanolamine, ethylenediamine and N,N-dimethylethylenediamine; primary and secondary unsubstituted and substituted cycloalkylamines with 5 to 12 carbon atoms, where one or more methylene groups may be substituted by —O—, —S—, or —NH— bridge member, such as in 3-amino-1-cyclohexyl-aminopropane, and preferably cyclohexylamine, 4,4'-diamino-dicyclohexylmethane and 3,3'-dimethyl-4,4'-diaminodicyclohexylmethane, primary and secondary unsubstituted and substituted aromatic amines with 6 to 15 carbon atoms, such as ethyl-alpha-naphthylamine, and preferably aniline, ortho- and/or para-toluidine, and 4,4'-diaminodiphenylmethane, primary and secondary aralkylamines with 7 to 11 carbon atoms, such as ortho- and/or para-methoxyphenylethylamines, and preferably benzylamine, phenylethylamine and homoveratrylamine, and aza-cycloalkane with 4 to 12 ring members in which one or more of the methylene groups may be substituted by —O—, —S—, —NH—, or —CO— bridge members and which optionally may contain alkyl radicals with 1 to 6 carbon atoms or carboxylate groups as substituents, such as 2-methylpiperidine, 4-methylpiperidine, pyridone-4, and preferably piperidine, hexamethylene imine, and morpholine and azaaromatics with at least one NH group, such as imidazole, 2-methyl imidazole, 4-methyl imidazole, 2-ethyl imidazole, 2-isopropyl imidazole, pyrazole, 3,methyl-pyrazole, and 3,5-dimethyl pryazole, preferably imidazole, 4-methyl imidazole and pyrazole.

Among the monocyclic amidines to be produced in this manner, the following are used on a preferred basis: hexahydro-1-(3,4,5,6-tetrahydro-7H-azepine-2-yl)-1H-azepine, N-(3,4,5,6-tetrahydro-7H-azepine-2-yl)-ethanolamine, N-(3,4,5,6-tetrahydro-7H-azepine-2-yl)-diethanolamine, N-(3,4,5,6-tetrahydro-7H-azepin-2-yl)-ethylenediamine, N,N'-di-(3,4,5,6-tetrahydro-7H-azepine-2-yl)-ethylenediamine, N-(3,4,5,6-tetrahydro-7H-azepine-2-yl)-N',N'-dimethyl ethylenediamine, N9(3,4,5,6-tetrahydro-7H-azepine-2-yl)-N-cyclohexylamine, N-(3,4,5,6-tetrahydro-7H-azepine-2-yl)-morpholine, N-(3,4,5,6-tetrahydro-7H-azepine-2-yl)-pyridone-4, N-(3,4,5,6-tetrahydro-7H-azepin-2-yl)-cysteamine, and particularly hexahydro-1-(3,4,5,6-tetrahydro-2H-azepine-7-yl)-1H-azepine, N-(tetrahydro-1-azepine-2-yl)-diethanolamine, N-(tetrahydro-1-azepine-2-yl)-cyclohexylamine, N-(tetrahydro-1-azepine-2-yl)-morpholine, and N-(tetrahydro-1-azepine-2-yl) aniline.

As previously indicated, the monocyclic amidines are advantageously used with co-catalysts of the group of
(a) tertiary amines
(b) metal compounds having the formula $MeX_nY_m$ (II) and
(c) optionally olefinically unsaturated double bond and/or hydroxyl group-containing aliphatic carboxylic acids with 2 to 18, preferably 2 to 10, carbon atoms.

(a) Examples for suitable tertiary amines include triethylamine, tributylamine, dimethylbenzylamine, N-methyl-, N-ethyl-, N-cyclohexylmorpholine, N,N,N',N'-tetramethyl-ethylenediamine, N,N,N',N'-tetramethyl-butanediamine-1,4, pentamethyldiethylenetriamine, N,N,N',N'-tetramethyldiaminoethylether, bis(dimethyl amino propyl)urea, dimethyl piperazine, 1,2-dimethyl imidazole, 1-aza-bicyclo(3,3,0)-octane, and preferably 1,4-diazabicyclo-(2,2,2)-octane, and alkanol compounds such as triethanolamine, triisopropanolamine, N-methyl- and N-ethyldiethanolamine and dimethylethanolamine. The tertiary amines are used in mole ratios of monocyclic amidine to tertiary amines of 0.1:1 to 0.5:1.

(b) Used as metal compounds in Formula $MeX_nY_m$ are preferably metal compounds as trivalent iron, bivalent nickel, bivalent manganese, bivalent and/or tetravalent tin. Examples include: Fe(III)acetate, Fe(III)oleate, Fe(III)stearate, Fe(III)acetylacetonate, Zn-acetate, Zn-oleate, Zn-acetylacetonate, Mn(II)acetate, Mn(II)acetylacetonate, MN(II)palmitate, MN(II)versatate, MN(II)naphthenate, Sn(II)acetate, Sn(II)octoate, Sn(II)isooctoate, Sn(II)ricinoleate, Sn(II)naphthenate, dibutyl-Sn(IV)laurate, dibutyl-Sn(IV)-octoate, diethyl-Sn(IV)-2-methylhexoate, diphenyl-Sn(IV)capronate, Ni(II)acetate, Ni(II)octoate, NI(II)oleate, Ni(I)ricinoleate, Ni(II)acetylacetonate, and NI(II)-salicylate.

The monocyclic amidines and metal compounds (b) may be added to the reactive mixture individually. By simple adding of the components at 0° C. to 150° C., preferably 10° C. to 80° C., however, complexes may also be produced. If one of the two components is liquid at this temperature, the complex formation can be carried out in the absence of solvents. If both components are solid, both components are combined to a complex by melting, or preferably one of the two components is dissolved in inert solvent such as benzene, toluene or methyl-tertiary-butylether and the other component is added while the mixture is being cooled. Subsequently, the solvent is removed, preferably under reduced pressure.

Catalysts consisting of mixtures of monocyclic amidines, tertiary amines (a) and metal compounds (b) have proven to work particularly well and are therefore used on a preferred basis. Suitable mixtures contain, for example, 0.01 part to 5.0 parts by weight, preferably 0.01 part to 1.0 part by weight, of at least one monocyclic amidine 0.0005 part to 5.0 parts by weight, preferably 0.01 part to 2.5 parts by weight of at least one tertiary amine, and 0.001 part to 2.5 parts by weight, preferably 0.05 part to 1.0 part by weight of a metal compound (b) per 100 parts by weight of polyol.

Catalyst systems with a delaying action are produced by combining monocyclic amidines with optionally, olefinically, unsaturated double-bond and/or hydroxyl group-containing aliphatic carboxylic acids. Typical acids of the mentioned type are monocarboxylic acids, such as formic, acetic, utaric, capronic, valerianic, octylic, lauric, stearic, and oleic acid; dicarboxylic acids, such as oxalic, malonic, succinic, fumaric and adipic acid; and hydroxycarboxylic acids, such as glycolic acid, lactic acid, ricinoleic acid, and carcaric acid. The catalyst combinations may be formed in situ in the reaction mixture by adding the individual components. However, it is also possible to transform the monocyclic amidines into a salt with a carboxylic acid at room temperature, optionally in the presence of inert solvents, such as benzene, hexane, methyl-tertiary butylether and to remove the solvent after completion of the reaction.

The monocyclic amidines or mixtures of monocyclic amidines and co-catalysts applicable toward the process of this invention, as well as their metal complexes and/or carboxylic acid salts, are soluble in low or high molecular polyhydroxyl compounds, for instance, polyols or chain extenders, as they are used for the preparation of polyurethane plastics. The monocyclic amidines are advantageously used in quantities of 0.001 to 5.00, preferably 0.01 part to 1.0 part by weight per 100 parts by weight of polyol. The mixtures of monocyclic amidines and co-catalysts, on the other hand, are used in quantities of 0.006 part to 10 parts by weight, preferably 0.02 part to 3.5 parts by weight per 100 parts by weight of polyol.

The basically known starting materials of polyurethane chemistry are suited for the preparation of optionally cellular polyurethane or polyurethane-polyurea molded parts.

Suitable polyisocyanates include aliphatic, cycloaliphatic, aralipathic, and preferably aromatic multi-functional isocyanates. Specific examples include: alkylene diisocyanates with 4 to 12 carbon atoms in the alkylene radical, such as 1,12-dodecane diisocyanate, tetramethylene diisocyanate-1,4, and preferably hexamethylene diisocyanate-1,6; cycloaliphatic diisocyanates, such as cyclohexane-1,3- and -1,4-diisocyanate as well as any desired mixtures of these isomers, 1-isocyanato-3,3,5-trimethyl-5-isocyanato methyl-cyclohexane (isophoronediisocyanate), 2,4- and 2,6-hexahydrotoluene diisocyanate, as well as the corresponding isomer mixtures, 4,4'-2,2'- and 2,4'-dicyclohexylmethane diisocyanate, as well as the corresponding isomer mixtures; and preferably aromatic di- and polyisocyanates such as 4,4'- 2,4'- and 2,2'-diisocyanatodiphenylmethane and corresponding isomer mixtures, 2,4- and 2,6-diisocyanato-toluene and the corresponding isomer mixtures, 1,5-diisocyanatonaphthalene, polyphenylene-polymethylene polyisocyanate, 2,4,6-triisocyanatotoluene, and preferably mixtures of di- and polyphenylene-polymethylene-polyisocyanates (crude MDI). The mentioned di- and polyisocyanates may be used individually or mixtures thereof.

More frequently so-called modified multi-functional isocyanates, that is products which were obtained by the chemical reaction of the above-mentioned di- and/or polyisocyanates, are used. Examples of modified organic di- and polyisocyanates include: carbodiimide group-containing polyisocyanates according to German Pat. No. 10 92 007, allophonate group-containing polyisocyanates as they are described, for example, in British Pat. No. 994,890, Belgian Pat. No. 761,626 and published Dutch Application No. 71 02 524; isocyanurate group-containing polyisocyanates as are described, for example, in German Pat. Nos. 10 22 789, 12 22 067 and 10 27 394, as well as German Publish Application Nos. 19 29 034 and 20 04 048; urethane group-containing polyisocyanates as they are described, for example, in Belgian Pat. No. 752,261 or U.S. Pat. No. 3,394,164; acrylated group-containing polyisocyanates in accordance with, for example, German Pat. No. 12 30 778; biuret group-containing polyisocyanate, for example, in accordance with German Pat. No. 11 01 394; and British Pat. No. 889,050; polyisocyanates produced by telemerization reaction, for instance, in accordance with Belgian Pat. No. 723,640; ester group-containing polyisocyanates as are described, for example, in British Pat. Nos. 965,474 and 1,072,956, U.S. Pat. No. 3,567,765 and German Pat. No. 12 31 688.

Preferably used, however, are urethane group-containing polyisocyanates, for instance, 4,4'-diphenylmethane diisocyanate, or toluene diisocyanate, modified with low molecular diols, triols or polypropylene glycol, carbodiimide group, and/or isocyanurate ring-containing polyisocyanate, based, for example, on diphenylmethane diisocyanate, and/or toluene diisocyanate, and particularly toluene diisocyanate, diphenylmethane diisocyanate, mixtures of diphenylmethane diisocyanate, and polyphenylene-polymethylene polyisocyanates (crude MDI), and mixtures of toluene diisocyanates and crude MDI.

Commonly used linear and/or branched, that is di- to tetra-functional, preferably di- and tri-functional polyester polyols, and particularly polyether polyols with molecular weights of 1000 to 8000, and preferably 2000 to 7000, are used as polyols for the process of this invention. However, other hydroxyl group-containing polymers with the mentioned molecular weight are also applicable. These include polyether amides, polyacetals, such as polyoxymethylenes, and butanediol-formals and polycarbonates, particularly those produced from diphenyl carbonate and 1,6-hexane diols by transesterification.

Suitable polyester polyols may be produced, for example, from dicarboxylic acids, preferably aliphatic dicarboxylic acid, with 2 to 12, preferably 4 to 8 carbon atoms in the alkylene radical and multi-functional alcohols, preferably diols. Examples include aliphatic dicarboxylic acids, such as succinic acid, glutaric acid, camelic acid, undecanedioic acid, dodecanedioic acid, and preferably adipic acid; and aromatic dicarboxylic acids, such as phthalic acid and terephthalic acid. Examples for bi and multi-functional, particularly bi-functional alcohols are: 1,2-propylene glycol; trimethylene glycol; dipropylene glycol; 1,5-pentane diol, 1,6-hexamethylene glycol, 1,10-decanediol, glycerine, trimethylolpropane and preferably ethylene glycol, diethylene glycol and 1,4-butanediol. Alkanolamines such as triethanolamine and triisopropanolamine may also be used as multi-functional alcohol. If poly-functional, particularly tri-functional compounds, are used in the preparation of the polyester polyols, their amount must be chosen in such a manner that the functionality of the resultant polyester polyol is 3.5, preferably 2 to 3.0 maximum.

Polyester polyols obtained by polycondensation of a dicarboxylic acid mixture containing, based on the overall weight of the mentioned dicarboxylic acid, 20 to 35 percent by weight, preferably 28 to 33 percent by weight, of succinic acid, 35 to 50 percent by weight, preferably 40 to 45 percent by weight of glutaric acids, and 20 to 32 percent by weight, preferably 24 to 28 percent by weight of adipic acid, and alcohol mixtures of ethylene glycol/1,4-butanediol, ethylene glycol/diethylene glycol, ethylene glycol/trimethylolpropane, diethylene glycol/trimethylolpropane, ethylene glycol/triisopropanolamine, and diethylene glycol/triisopropanolamine, have proven to work particularly well and are therefore used on a preferred basis.

The polyester polyols have molecular weights of 1000 to 3000, and preferably 1500 to 2500.

However, preferably used as polyols, are polyether polyols which are produced according to known methods from one or more alkylene oxides with 2 to 4 carbon atoms in the alkylene radical, and an initiator molecule containing 2 to 8, preferably 2 to 4 active hydrogen atoms.

Suitable alkylene oxides include, for example, 1,2- and/or 2,3-butylene oxide, 1,3-propylene oxide, and preferably ethylene oxide and 1,2-propylene oxide. The alkylene oxides may be used individually, alternatingly in sequence, or as mixtures. Other epoxy compounds such as tetrahydrofuran, styrene oxide and epichlorohydrin may also be used. Examples of initiator molecules include: water, organic dicarboxylic acids, such as succinic acid, adipic acid, phthalic acid, and terephthalic acid, aliphatic and aromatic optionally N-mono, N,N,- and N,N'-dialkyl-substituted diamines with 1 to 4 carbon atoms in the alkyl radical, such as optionally mono- and dialkyl-substituted ethylenediamine, diethylenetriamine, triethylenetetramine, 1,3-propylenediamine, 1,3- and/or 1,4-butylenediamine, 1,2-, 1,3-, 1,4-, 1,5-, and 1,6-hexamethylenediamine, phenylenediamine, 2,4- and 2,6-toluenediamine, and 4,4'-, 2,4'- and 2,2'-diaminodiphenylmethane. Of particular interest among the compounds of the above-described group are N,N,N',N'-tetrakis-(2-hydroxyethyl)ethylenediamine; N,N,N',N'-tetrakis-(2-hydroxypropyl)ethylenediamine; N,N,N',N'',N'''-pentakis-(2-hydroxypropyl)ethylenetriamine, phenyldiisopropanolamine, and higher alkylene oxide adducts of aniline.

Other suitable initiary molecules include alkanolamines, such as ethanolamine, diethanolamine, N-methyl and N-ethylethanolamine, N-methyl and N-ethyldiethanolamine and triethanolamine, ammonium, hydrogen and hydrazides. Preferably used are multi-functional, particularly bi- and/or tri-functional alcohols, such as ethylene glycol, 1,2-propylene glycol, and trimethylene glycol, diethylene glycol, dipropylene glycol, 1,4-butylene glycol, 1,6-hexamethylene glycol, glycerine, trimethylolpropane and pentaerythritol.

Other applicable polyols are the non-reducing sugar, the non-reducing sugar derivatives, and preferably their alkylene oxide adducts; wherein the alkylene oxides have 2 to 4 carbon atoms. Applicable non-reducing sugar and sugar derivatives include, for example, saccarose, alkylglycosides, such as methyl glycoside and ethylene glucoside, also glycol glycosides such as ethylene glycol glucoside, propylene glycol glucoside, glycerine glucoside, and 1,2,6-hexanetriol glucoside.

Also taken into consideration are polyols based on polyphenols, and preferably their alkylene oxide adducts wherein the alkylene oxides have 2 to 4 carbon atoms. Applicable polyphenols include, for example, Bisphenol A, Bisphenol F, condensation products of phenol and formaldehyde, particularly the novalacs, condensation products of various phenol compounds, and alkylenes with the simplest substances of this group being 1,1,3-tris-(hydroxyphenyl)propane, condensation products of various phenol compounds with glyoxal, glutaraldehyde, and other dialdehydes, with the simplest products in this group being the 1,1,2,2-tetrakis-(hydroxyphenyl)-ethanes.

Another applicable group of polyols are the alkylene oxide adducts, preferably the ethylene oxide, 1,2-epoxypropane, epoxybutane, and their mixtures, condensation products of aromatic amines, phenol and aldehyde. The condensation products are obtained by condensing an aromatic amine, for example, aniline or toluidine, a phenol, or cresol, and an aldehyde, preferably formaldehyde, at increased temperatures, for example, in the range of 60° to 180° C. The condensation product is then isolated and reacted with an alkylene oxide forming the polyol. Particularly worth mentioning are the propylene oxide and propylene oxide-ethylene oxide adducts of aniline/phenol/formaldehyde condensation products.

The alkylene oxide adducts of phosphoric and polyphosphoric acids are another applicable group of polyols. Preferred alkylene oxides are ethylene oxide, 1,2-propylene oxide, the epoxybutanes, and 3-chloro-1,2-epoxypropane. Advantageous phosphoric acids are phosphoric acid, phosphorus acid, the polyphosphoric acids such as tri-polyphosphoric acid and the polymetaphosphoric acid.

The polyether polyols have molecular weights of 2000 to 8000, and preferably 2500 to 7000. As the polyester polyols they may be used individually or in form of mixtures. They may further be mixed with the polyester polyol and hydroxyl group-containing polyester amides, polyacetols and polycarbonates.

Preferably used chain extenders are low molecular di- to tetra-functional compounds of the group of aliphatic and/or araliphatic diols and/or triols, the secondary aromatic diamines, the aromatic diamines, and the 3,3'5,5'-tetra-alkyl-substituted 4,4'-diaminodiphenylmethane.

Suitable diols and triols advantageously have molecular weights of less than 400, preferably 60 to 300. Examples of suitable compounds are aliphatic and/or araliphatic diols with 2 to 14, preferably 4 to 10 carbon atoms, such as ethylene glycol, 1,3-propanediol, 1,10-decanediol, diethylene glycol, dipropylene glycol, and preferably 1,4-butanediol, 1,6-hexanediol, and bis-(2-hydroxyethyl)hydraquinone, triols such as glycerine and trimethylolpropane and low molecular hydroxyl group-containing polyalkylene oxides based on ethylene and/or propylene oxide and above-mentioned initiator molecules.

Examples of secondary aromatic diamines include: N,N'-dialkyl-substituted aromatic diamines which may optionally be substituted at the aromatic nucleus by alkyl radicals with 1 to 20, preferably 1 to 4 carbon atoms in the N-alkyl radical, such as N,N'-diethyl-, N,N'-di-secondary-pentyl-, N,N'-di-secondary-hexyl-, N,N'-di-secondary-decyl-, N,N'-dicyclohexyl-para- and/or meta-phenylenediamine, N,N'-dimethyl-, N,N'-diethyl-, N,N'-diisopropyl-, N,N'-di-secondary-butyl-, N,N'-dicyclohexyl-4,4''-diaminodiphenylmethane and N,N'-di-secondary-butylbenzidine.

Suitable aromatic diamines advantageously include those which have at least one alkyl substituent in the ortho position to the amino group, which are liquid at room temperature, and are miscible with the polyol, particularly polyether polyol. Alkyl-substituted meta-phenylenediamine having the formula

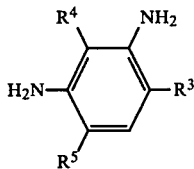

and/or

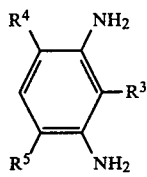

in which $R^5$ and $R^4$ are the same or different and is a methyl-, ethyl-, propyl- or isopropyl radical and in which $R^3$ denotes a branched alkyl radical with 4 to 10, preferably 4 to 6 carbon atoms also have proven to work well. Alkyl radicals $R^3$ in which the branching point is located at the $C^1$ carbon atom have proven to work particularly well. Examples for radicals $R^3$ include 1-methyloctyl-, 2-ethyloctyl-, 1-methylhexyl-, 1,1-dimethylpentyl-, 1,3,3-trimethylhexyl-, 1-ethylpentyl-, 2,ethylpentyl- and preferably cyclohexyl-, 1-methyl-n-propyl-, tertiary butyl-, 1-ethyl-n-propyl-, 1-methyl-n-butyl- and 1,1-dimethyl-n-propyl-radical.

Examples of alkyl-substituted meta-phenylene-diamines include: 2,4-dimethyl-6-cyclohexyl-, 2-cyclohexyl-4,6-diethyl-, 2-cyclohexyl-2,6-isopropyl-, 2,4-dimethyl-6-(1-ethyl-n-propyl)-, 2,4-dimethyl-6-(1,1-dimethyl-n-propyl)-2-(1-methyl-n-butyl)-4,6-dimethyl-phenylenediamine-1,3. Preferably used are 2,4-dimethyl-6-tertiarybutyl-, 2,4-dimethyl-6-isooctyl-, and 2,4-dimethyl-6-cyclohexyl-meta-phenylenediamine-1,3.

Suitable 3,3',5,5'-tetra-n-alkyl-substituted 4,4'-diaminodiphenylmethanes include, for example, 3,3',5,5'-tetramethyl-, 3,3',5,5'-tetraethyl-, and 3,3',5,5-tetra-n-propyl-4,4'-diaminodiphenylmethane.

Preferably used are diaminodiphenylmethanes having the following formula

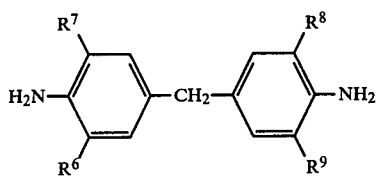

in which $R^6$, $R^7$, $R^8$ and $R^9$ are the same or different, and represent a methyl-, ethyl-, propyl-, isopropyl-, secondary butyl- or tertiary butyl radical with at least one of the radicals having to be an isopropyl or secondary butyl radical. The 4,4'-diaminodiphenylmethane may also be used as mixtures with isomers having formulas

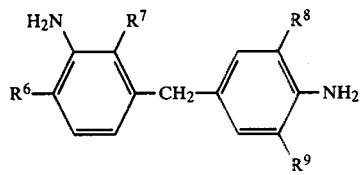

and/or

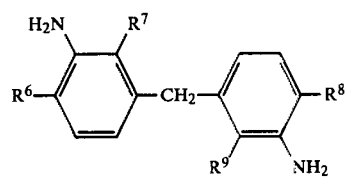

wherein $R^6$, $R^7$, $R^8$ and $R^9$ have the above-identified meaning.

Examples include: 3,3',5-trimethyl-5'-isopropyl-, 3,3',5-triethyl-5'-isopropyl-, 3,3',5-trimethyl-5'-secondary butyl-, and 3,3',5-triethyl-5'-secondary butyl-4,4'-diamino-diphenylmethane, 3,3'-dimethyl-5,5'-diisopropyl-, 3,3'-diethyl-5,5'-diisopropyl-, 3,3'-dimethyl-5,5'-di-secondary butyl-, 3,3-'diethyl-5,5'-di-secondary butyl-, 3,5-dimethyl-3',5'-diisopropyl-, 3,5-diethyl-3',5'-diisopropyl-, 3,5'-dimethyl-3',5-di-secondary butyl-, and 3,5-diethyl-3',5'-di-secondary butyl-4,4'-diamino-diphenylmethane, 3-methyl-3',5,5'-triisopropyl-, 3-ethyl-3',5,5'-triisopropyl-, 3-methyl-3',5,5'-tri-secondary butyl-, and 3-ethyl-3',5,5'-tri-secondary butyl-4,4'-diaminodiphenylmethane, 3,3'-diisopropyl-5,5'-di-secondary butyl-, 3,5-diisopropyl-3',5'-di-secondary butyl-, 3-ethyl-5-secondary butyl-3',5'-diisopropyl-, 3-methyl-5-tertiary-butyl-3',5'-diisopropyl-, 3-ethyl-5-secondary butyl-3'-methyl-5'-tertiary-butyl-, 3,3,'5,5'-tetraisopropyl- and 3,3',5,5'-tetra-secondary butyl-4,4'-diaminodiphenylmethane. Preferably used are 3,5-dimethyl-3',5'-diisopropyl- and 3,3',5,5'-tetraisopropyl-4,4'-diaminodiphenylmethane. The diaminodiphenylmethanes may be used individually or mixtures thereof.

The mentioned chain extenders may be used individually or as mixtures thereof.

In accordance with the process of this invention, the chain extenders or their mixtures are used in amounts of 2 to 60 percent by weight, preferably 8 to 50 percent by weight, and particularly 10 to 40 percent by weight, based on the weight of the polyols and the chain extenders.

The blowing agents which may optionally be used for the process of this invention include water which reacts with isocyanate groups to form carbon dioxide. The amount of water which may be used advantageously is 0.5 to 2 percent by weight based on the polyol weight.

Other applicable blowing agents are low boiling liquids which evaporate under the influence of the exothermal polyaddition reaction. Suited are liquids which are inert with respect to the organic polyisocyanate and have boiling points below 100° C. Examples of such preferably used liquids are halogenated hydrocarbons such as methylene chloride, trichlorofluoromethane, dichlorodifluoromethane, dichloromonofluoromethane, dichlorotetrafluoroethane and 1,1,2-trichloro-1,2,2-trifluoroethane.

Mixtures of these low boiling liquids with each other and/or with other substituted or unsubstituted hydrocarbons may also be used.

The most advantageous amount of low boiling liquid for the manufacture of cellular polyurethane or polyurethane-polyurea molded parts is a function of the density which is to be achieved, as well as optionally of the use of water. Generally, amounts of 0.5 part to 15 parts by weight based on 100 parts by weight of polyol provide satisfactory results.

Auxiliaries and additives may be incorporated in the reaction mixture on an optional basis. Examples include surfactants, foam stabilizers, cell regulators, fillers, dies, pigments, flame retardants, hydrolysis protection agents, fungistats and bacteriostats.

Substances serving to support the homogenization of the starting materials, and which may optionally also be suited for regulating the cell structure, are used as surfactants. Examples include emulsifiers such as sodium salts of castor oil, sulphates, or of fatty acids, as well as salts of fatty acids with amines, for example, diethylamine-oleate or diethanolamine-stearate, salts of sulfonic acid, for example, alkali or ammonium salts of dodecylbenzene or dinaphthylmethane disulfonic acid and ricinoleic acid; from stabilizers such as siloxane-oxalkylene mixed polymers and other organo-polysiloxanes, ethoxylated alkyl phenols, ethoxylated fatty alcohols, paraffin oils, castor oil, and/or ricinoleic acid esters and Turkish red oil, and cell regulators such as paraffins, fatty alcohols and dimethylpolysiloxanes. The surface active substances are generally used in amounts of 0.01 to 5 parts by weight, based on 100 parts by weight of polyol.

Fillers, particularly reinforcing fillers, are understood to be the basically known organic and inorganic fillers, reinforcing agents, weighting agents, agents for improving the abrasion behaviour in coatings, paints etc. Detailed examples include: inorganic fillers such as silicatic minerals, for example, layered silicates such as antigorite, serpentine, horn blends, amphiboles, chrisotile, talcum; metal oxides such as kaolin, aluminum oxides, titanium oxides and iron oxides, metal salts such as lime, heavy spar and inorganic pigments such as cadmium sulphide, zinc sulphate, as well as glass, asbestos meal and others. Preferably used are kaolins (china clay), aluminum silicate, and cold precipitates, barium sulphate, and aluminum silicate as well as natural and synthetic fibrous minerals such as asbestos, wollastonite, and particularly, glass fibers of various lengths which may be optionally sized. Examples for suitable organic fillers include: carbon, melamine, colophony, cyclopentadienyl resins, and preferably graft polymers based on styrene-acrylonitrile which were obtained by in situ polymerization of acrylonitrile-styrene mixtures in polyether polyols in accordance with the data in German Pat. Nos. 11 11 394, 12 22 669 (U.S. Pat. Nos. 3,304,273, 3,383,351, 3,523,093 and 3,823,301) 11 52 536 (British Pat. No. 1,040,452) and 11 52 537 (British Pat. No. 987,618) as well as filter polyols where aqueous polymer dispersions are transformed into polyol dispersions.

The inorganic and organic fillers may be used individually or as mixtures. Preferably used are stablefiller polyol dispersions where the fillers in the presence of polyols undergo size reduction processes to particle sizes of less than 7 microns, in situ and with high local energy densities and are simultaneously dispersed. Fillerpolyol dispersions of this type are described, for example, in German Published Application Nos. 28 50 609, 28 50 610 and 29 32 304.

The inorganic and organic fillers are advantageously added to the reaction mixture in amounts of 0.5 to 50 percent by weight, preferably 1 to 40 percent by weight, based on the weight of polyisocyanate-polyol mixture.

Suitable flame retardants include, for example, tricresylphosphate, tris-2-chloroethylphosphate, trischloropropylphosphate, and tris-2,3-dibromopropylphosphate.

In addition to the already mentioned halogen-substituted phosphates, inorganic flame retardants such as aluminum oxide hydrate, antimony trioxide, arsenic oxide, ammonium polyphosphate and calcium sulphate, as well as esterification products of low molecular polyols and halogenated phthalic acid derivatives, may be used to render the molded parts flame resistant. Generally it has been found to be advantageous to use 5 to 50 parts by weight, preferably 5 to 25 parts by weight, of the referenced flame retardants per 100 parts by weight of polyol.

Detailed data on the above-mentioned, other commonly used auxiliaries and additives are contained in the appropriate literature, for instance, the monograph by J. H. Saunders and K. C. Frisch, "High Polymers," Vol. XVI, Polyurethanes, Parts 1 and 2, Interscience Publishers, 1962 and 1964.

For the preparation of optionally cellular polyurethane or polyurethane-polyurea molded parts, the organic polyisocyanates, polyols and chain extenders are reacted in such amounts that the ratio of NCO groups to Zerewitinoff active hydrogen atoms bonded to OH—, $NH_2$ and —NHR groups is 1:0.9 to 1:1.25, preferably 1:0.95 to 1:1.15.

The cellular, and preferably noncellular compact polyurethane or polyurethane-polyurea molded parts are preferably prepared by the one-shot method according to the known reaction injection molding technique. This mode of operation is described, for example, by Piechota and Roehr in "Integral Foams," Carl-Hanser Publishers, Munich, Vienna, 1975; D. J. Prepelka and J. L. Wharton in the Journal of Cellular Plastics, March/April 1975, pages 87–98; and U. Knipp in the Journal of Cellular Plastics, March/April 1973, pages 76–84. However, the formulations may also be processed by conventional methods into cast elastomers and integral foams.

By using a mixing chamber with several feed nozzles, the initial components may be introduced individually and may be mixed intensively in the mixing chamber. It has proven to be particularly advantageous to work in accordance with the two-component process and to dissolve the chain extenders in the polyols, and combine this solution with a catalyst, and optionally with blowing agents, auxiliaries and additives in component A, and to use the organic polyisocyanates as component B. An advantage of this mode of proceeding is that components A and B can be stored separately and may be transported in a space-saving manner and only require mixing in the appropriate amount in order to be processed.

The amount of the reaction mixture introduced into the form is metered in such a manner that the resultant microcellular and/or noncellular molded parts have a density of 0.8 to 1.4 grams/cubic centimeter, preferably 0.9 to 1.35 grams/cubic centimeter, and that the cellular molded parts have a density of 0.1 to 0.8 grams per cubic centimeter, preferably 0.15 to 0.6 grams/cubic centimeter. The starting components are introduced into the mold at a temperature of 15° C. to 70° C., preferably 20° C. to 55° C. The mold temperature is advantageously 20° C. to 90° C., preferably 40° C. to 85° C. It may also be advantageous to use commonly applied molded release agents, for instance, those based on wax or silicone, in order to improve the unmolding. The degrees of compression vary within a range of 1.1 to 8.

The noncellular and/or microcellular polyurethane of polyurethane-polyurea molded parts obtainable according to this invention are particularly well suited for use in the automobile industry, for example as shock absorber seals and body parts such as fenders, spoilers and wheel well expansions, as well as housing parts and rollers. The cellular foams are used, for example, as shoe soles, arm supports, head supports, safety covers inside the automobile, as well as motorcycle and bicycle seats and cover layers in composite foams.

The parts referred to in the examples are parts by weight.

EXAMPLE 1

Preparation of hexahydro-1-(3,4,5,6-tetrahydro-7H-azepine-2-yl)-1H-azepine.

508 parts of 2-methoxy-3,4,5,6-tetrahydro-7H-azine (Caprolactim-O-methylether) were placed in a vessel, heated to 100° C., and 396 parts of hexamethyleneimine were added dropwise at this temperature while the mixture was being stirred. After the addition was completed, the reaction mixture was stirred at 135° C. for a few hours, during which time the methanol formed by the reaction was removed by distillation. For further purification the resultant crude product could be distilled optionally under reduced pressure.

708 parts (91 percent of theory) of product with a boiling point of 111° C. to 113° C. at 0.4 millibars were obtained.

EXAMPLES 2–10

The procedure was analogous with that presented in Example 1, but hexamethyleneimine was replaced by the amines and amounts listed in Table 1.

TABLE 1

| Example | Amine | Amount (Parts) | Monocyclic Amidine | Yield (Parts) | Physical Data |
|---|---|---|---|---|---|
| 1 | Hexamethyleneamine | 396 | (CH$_2$)$_5$ C—N (CH$_2$)$_6$ with N | 708 | Boiling Point$_{0.4}$*: 111–113° C. |
| 2 | Ethanolamine | 244 | (CH$_2$)$_5$ C—NH—CH$_2$—CH$_2$—OH with N | 537 | Flash Point: 113–115° C. |
| 3 | Diethanolamine | 420 | (CH$_2$)$_5$ C—N(CH$_2$—CH$_2$—OH)$_2$ with N | 658 | Boiling Point$_{0.1}$*: 200° C. |
| 4 | Ethylenediamine | 240 | (CH$_2$)$_5$ C—NH—CH$_2$CH$_2$—NH$_2$ with N | 566 | Flash Point: 71–73° C. |
| 5 | Ethylenediamine | 120 | (CH$_2$)$_5$ C—NH—CH$_2$—CH$_2$—NH—C (CH$_2$)$_5$ with N on both sides | 447 | Flash Point: 115° C. |
| 6 | N,N—Dimethylethylenediamine | 352 | (CH$_2$)$_5$ C—NH—CH$_2$—CH$_2$—N(CH$_3$)$_2$ with N | 617 | Boiling Point$_{2.0}$*: 120–121° C. |
| 7 | Cyclohexylamine | 396 | (CH$_2$)$_5$ C—NH—cyclohexyl with N | 537 | Flash Point: 140–143° C. |
| 8 | Morpholine | 348 | (CH$_2$)$_5$ C—N—morpholine (O) with N | 580 | Boiling Point$_{0.1}$*: 107–112° C. |
| 9 | 4-Pyridone | 396 | (CH$_2$)$_5$ C—N—ring—C=O with N | 349 | Boiling Point$_{1.0}$*: 118–120° C. |

TABLE 1-continued

| Example | Amine | Amount (Parts) | Monocyclic Amidine | Yield (Parts) | Physical Data |
|---|---|---|---|---|---|
| 10 | Aniline | 372 | 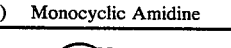 | 548 | Flash Point: 105–107° C. |
| 11 | Cysteamine | 308 |  | 422 | Boiling Point$_{0.1}$*: 170° C. (Bath Temperature) |

*millibars

EXAMPLES FOR RIM MATERIALS

Unless otherwise noted, the system formulations described in the following were processed according to the RIM method using high pressure metering devices where the substances were mixed according to a counter-current nozzle system (machines of the Puromat series by Elastogran Machine Construction/Strasslach, near Munich).

For the mechanical tests, panels with various dimensions (300×300-1000×4 millimeters or 600×400×4 millimeters) were prepared in heatable, closed panel molds of steel or aluminum. In addition to this, molded parts such as automobile fenders, spoilers, motorcycle fenders, fender expansion strips, shock absorber seals and other parts were prepared in steel-aluminum and epoxide molds. The molds were filled via direct or fan gate or via accumulator-head with optionally integrated postmixing elements. The shot weights varied between 350 to approximately 5000 grams.

COMPARISON EXAMPLE I 65 parts of a block copolyether polyol based on trimethylolpropane-propylene oxide-ethylene oxide with a hydroxyl number of 25, 35 parts of 3,3',5,5'-tetraisopropyl-4,4'-diaminodiphenylmethane and 0.60 part of diazabicyclooctane which had previously been dissolved in a partial quantity of the polyol, were mixed to form a polyol component and were processed in accordance with the RIM method with 42.7 parts (corresponding with an Index of 1.05) of a reaction product of dipropylene glycol and 4,4'-diphenylmethane diisocyanate, having an isocyanate content of 23 percent, using a high pressure metering device of the Puromat 80 Type.

The temperature of the system components was 50° C., the panel mold (500×300×4 millimeters) was also heated to 50° C. The mold time was 15 seconds. Subsequently the molded panel was subjected to a bend test. For this purpose the sample is bent by 180° as quickly as possible in certain time intervals, in each case at a different point. The test is repeated until no additional hairline cracks appear on the bent panel. The time determined by this test is referred to as Crack Free Time.

The density of the panels was 1.05 to 1.08 grams/cubic centimeter. The mechanical measuring values summarized in Table 2 were determined by way of these test panels. After preparation, the panels were tempered at 120° C. for 1 hour.

Several of the panels were stored at room temperature for 30 days and were then tempered at 100° C. for 3 hours. The values determined by a tensile test are also listed in Table 2.

COMPARISON EXAMPLE II 65 parts of a polyether polyol used in Comparison Example I and 35 parts of 3,3',5,5'-tetraisopropyl-4,4-diaminodiphenylmethane were mixed with 1.0 part of a 33 percent solution of diazabicyclooctane in dipropylene glycol and 0.2 part of dibutyl tin dilaurate to form a polyol component and were processed with 44.6 parts (corresponding with an Index of 1.05) of the isocyanate product described in Comparison Example I under the conditions also described under that example. The result of the bend test as well as the mechanical properties of the panels were listed in Table 2.

COMPARISON EXAMPLE III 100 parts of the polyether polyol-diamine mixture described in Comparison Example II were combined with 1.0 part of a 33 percent solution of diazabicyclooctane in dipropylene glycol and 0.11 part of a complex compound of 2,3-dimethyl-3,4,5,6-tetrahydropyrimidine and dibutyl tin dilaurate in a mole ratio of 1:1 to form a polyol component which was processed with 44.6 parts (corresponding with an Index of 1.05) of the isocyanate product described under Comparison Example I under the conditions also described under that example. The result of the bend test as well as the mechanical properties of the test panels are listed in Table 2.

EXAMPLES 12-17

The products of Examples 12-17 were all produced in accordance with the data put forth in Comparison Example III with the monocyclic amidines and metal compounds (b) having been incorporated in the polyether polyol diamine mixture as individual components or in the form of complexes. The applied catalysts, their quantities and the properties determined by testing the resultant molded panels were summarized in Table 2.

TABLE 2

Examples 12-17, Comparison Examples I–III
Bending Test as a Function of the Catalyst System

| Example No. | Comparison I$^c$ | Comparison II | Comparison III | 12 | 13 | 14 | 15 | 16 | 17 |
|---|---|---|---|---|---|---|---|---|---|
| Monocyclic Amidines | | | | | | | | | |
| Example No. | — | — | $e$ | 1 | 1 | 1 | 3 | 10 | 7 |
| % by weight in polyol | — | — | 0.03 | 0.04 | 0.04 | 0.04 | 0.04 | 0.04 | 0.04 |
| Type of addition | — | — | Sn-Com- | Sn-Com- | Sm-Com- | separated | Sn-Com- | separated | separated |

TABLE 2-continued

Examples 12-17, Comparison Examples I-III
Bending Test as a Function of the Catalyst System

| Example No. | Comparison I[c] | Comparison II | Comparison III | 12 | 13 | 14 | 15 | 16 | 17 |
|---|---|---|---|---|---|---|---|---|---|
| Co-catalyst[a] | | | plex | plex | plex | | plex | | |
| Type | A | A   B | B   A | B | B   A | B   A | B | B   A | B   A |
| % by weight in polyol | 0.60 | 0.33   0.20 | 0.08   0.33 | 0.06 | 0.06   0.33 | 0.06   0.33 | 0.06 | 0.06   0.33 | 0.06   0.33 |
| Mole Ratio (xB:100A) | 42.7 | 44.6 | 44.6 | 42.7 | 44.6 | 44.6 | 44.6 | 44.6 | 44.6 |
| Physical Properties | | | | | | | | | |
| t Crack Free[b] | 60 | 15 | 35 | 25 | 20 | 20 | 35 | 20 | 20 |
| Tear Strength (N/mm²) | 24.4 (13.5)[d] | 33.3 (8.4) | — | 27.5 (24.8) | — | — | — | — | — |
| Breaking Elongation (%) | 230 230[d] | 320 (20) | — | 250 (350) | 84.1 | 62 | 25.0 25.0 | — | — |
| Graves Tear Strength | 84.4 | 103.4 | — | 84.1 | — | — | 83.9 | — | — |
| Hardness (Shore D) (N/mm) | 63 | 64 | — | 62 | — | — | 62 | — | — |

[a]co-catalyst: A = Diazabicyclo-octaine; B = bibutyl tin bilaurate
[b]measured by bending test
[c]unmolded panels frequently showed cracks
[d]values in ( ): after 4 weeks storage and subsequent tempering at 160° C. for 3 hours
[e]2,3-dimethyl-3,4,5,6-tetrahydropyrimidine as Sn-Complex in accordance with German Application 26 22 951, Example 1

EXAMPLES FOR SHOE SOLE MATERIALS

The system formulations described below were processed on a low pressure forming machine, Model EMB F 20 ST, into test panels having dimensions 200×200×10 millimeters. The temperature of the polyol and isocyanate components was 25° C., the temperature of the aluminum mold was 50° C.

In order to carry out the bending test, the test panels were demolded after 2.5 minutes and were bent by 180° as quickly as possible at time intervals of 15 seconds and at different points. The test was repeated until no additional hairline cracks appeared at the bent panel piece (tCrack Free).

The bulk density of the test panel was 0.5 grams/cubic centimeter and the values for the mechanical properties were listed in Table 3.

COMPARISON EXAMPLE IV 83.15 parts of a filler-polyether polyol dispersion produced by wet grinding of 15 percent by weight of talcum in a mixture of 70 parts of a block copolyether polyol based on dipropylene glycol-propylene oxide-ethylene oxide with a hydroxyl number of 29 and 30 parts of a block copolyether polyol based on trimethylolpropane-propylene oxide-ethylene oxide having a hydroxyl number of 35, 6.29 parts of 1,4-butanediol,
0.78 parts of ethylene glycol,
1.68 part of a 25 percent solution of diazabicyclo-octane in 1,4-butanediol,
0.10 part of silicone oil DC 193 (Dow Corning),
0.025 part dibutyl tin dilaurate, and
7.93 parts of trichlorofluoromethane were mixed into one polyol component,
and were processed with 44, 45 and/or 46 parts of the isocyanate component described for Comparison Example I. The result of the bending test as well as the mechanical properties of the test panels measured in accordance with RAL-RG 702/1 are listed in Table 3.

COMPARISON EXAMPLE V 0.05 part of a salt of octanic acid and 1,8-diazabicyclo(5.4.0)undecene (Polycat No. 102 by Sanyo Abbott) are added to the polyol component described under Comparison Example IV. The material is processed in accordance with the information put forth under Comparison Example IV. The resultant mechanical properties are compiled in Table 3.

EXAMPLE 18

0.05 part of a salt of octanic acid and the monocyclic amidine according to Example 1 are added to the polyol component described in Comparison Example IV. Processing takes place as described in Comparison Example IV. The resultant mechanical properties are presented in Table 3.

TABLE 3

Determination of Crack Free (Bending Test) On Test Panels of Shoe Sole Material

| Comparison Example | Mole Ratio (xB:100A) | [t]Crack Free (Minutes) |
|---|---|---|
| IV | 44 | 6 |
|    | 45 | 5 |
|    | 46 | 6 |
| V  | 44 | 4.5 |
|    | 45 | 4 |
|    | 46 | 4 |
| 18 | 44 | 3.75 |
|    | 45 | 3.5 |
|    | 46 | 3.5 |

COMPARISON EXAMPLES VI-XIII

Polyol Component:
68.1 parts of a block copolyether polyol based on dipropylene glycol-propylene oxide-ethylene oxide wih a hydroxyl number of 29,
12.3 parts of a block copolyether polyol based on glycerine-propylene oxide-ethylene oxide with a hydroxyl number of 25
4.5 parts of a block copolyether polyol based on glycerine-propylene oxide-ethylene oxide with a hydroxyl number of 35,
7.3 parts 1,4-butanediol,
0.5 part ethylene glycol,
1.6 and/or 1.0 parts of a 25 percent solution of diazabicyclooctane in 1,4-butanediol,
0.1 part of a 50 percent solution of water in sulfonated castor oil
0.005 and/or 0.016 part dibutyl tin dilaurate, 0.1 part silicone oil DC 193 (Dow Corning), and
5.5 parts trichlorofluoromethane
were mixed intensively and were used as polyol component.

Polyisocyanate Component:

Reaction product of dipropylene glycol and 4,4'-diphenylmethane diisocyanate with an NCO content of 23 percent. In order to produce the molded parts, system components were brought to reaction in accordance with the procedure set forth in Comparison Example I.

The mixing ratios of polyol, polyisocyanate component, the effective catalyst amounts, and the tCrack Free values determined on the molded parts are summarized in Table 4.

EXAMPLES 19–42

The procedure set forth in Comparison Examples VI–XIII was duplicated, but additional monocyclic amidines or amidine-butyl tin dilaurate complexes were added to the polyol components as catalysts.

The type and amount of the amidines or complexes used, the mixing ratios of polyol to polyisocyanate component, and the tCrack Free values determined on the molded parts were summarized in Table 5.

The asterisk in Table 5 denotes that a complex of 0.06 part dibutyl tin dilaurate and 0.04 part as the mentioned amidine were used as catalysts which was produced in a separate process step.

TABLE 4
Comparison Examples VI–XIII
Bending Test as Test Panels of Shoe Sole Materials

| | VI | VII | VIII | IX | X | XI | XII | XIII |
|---|---|---|---|---|---|---|---|---|
| Polyol Component (Parts) | 100 | 100 | 100 | 100 | 100 | 100 | 100 | 100 |
| Polyisocyante Component (Parts) | 46 | 47 | 46 | 47 | 46 | 47 | 46 | 47 |
| Diazabicyclooctane (Part) | 0.40 | 0.40 | 0.25 | 0.25 | 0.25 | 0.25 | 0.25 | 0.25 |
| Dibutyl tin dilaurate (Part) | 0.005 | 0.005 | 0.016 | 0.016 | 0.076 | 0.076 | 0.076 | 0.076 |
| tCrack Free (Minutes) | 6.0 | 5.75 | 6.0 | 6.25 | 4.25 | 4.25 | 4.25 | 4.25 |

TABLE 5
Examples 19–42
Bending Test Of Test Panels Of Shoe Sole Materials

| Examples | | 19 | 20 | 21 | 22 | 23 | 24 | 25 | 26 |
|---|---|---|---|---|---|---|---|---|---|
| Polyol Component | (Parts) | 100 | 100 | 100 | 100 | 100 | 100 | 100 | 100 |
| Polyisocyanate Component | (Parts) | 46 | 47 | 46 | 47 | 46 | 47 | 46 | 47 |
| Diazabicyclooctane | (Part) | 0.40 | 0.40 | 0.25 | 0.25 | 0.25 | 0.25 | 0.25 | 0.25 |
| Dibutyl tin dilaurate | (Part) | 0.005 | 0.005 | 0.016 | 0.016 | 0.076 | 0.076 | 0.016 | 0.016 |
| (amidine A) | (Part) | 0.10 | 0.10 | 0.10 | 0.10 | 0.04 | 0.04 | 0.1* | 0.1* |
| (amidine B) | (Part) | — | — | — | — | — | — | — | — |
| (amidine C) | (Part) | — | — | — | — | — | — | — | — |
| tCrack Free | (Minutes) | 4.5 | 4.75 | 4.75 | 5.0 | 3.5 | 3.75 | 2.75 | 2.75 |
| Examples | | 27 | 28 | 29 | 30 | 31 | 32 | 33 | 34 |
| Polyol Component | (Parts) | 100 | 100 | 100 | 100 | 100 | 100 | 100 | 100 |
| Polyisocyanate Component | (Parts) | 46 | 47 | 46 | 47 | 46 | 47 | 46 | 47 |
| Diazabicyclooctane | (Part) | 0.40 | 0.40 | 0.25 | 0.25 | 0.25 | 0.25 | 0.25 | 0.25 |
| Dibutyl tin dilaurate | (Part) | 0.005 | 0.005 | 0.016 | 0.016 | 0.076 | 0.076 | 0.016 | 0.016 |
| (amidine A) | (Part) | — | — | — | — | — | — | — | — |

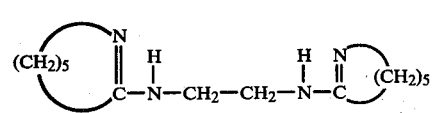

TABLE 5-continued

Examples 19–42
Bending Test Of Test Panels Of Shoe Sole Materials

| | | | | | | | | | |
|---|---|---|---|---|---|---|---|---|---|
| ![structure] | (Part) | 0.10 | 0.10 | 0.10 | 0.10 | 0.04 | 0.04 | 0.1* | 0.1* |
| ![structure] | (Part) | — | — | — | — | — | — | — | — |
| 'Crack Free | (Minutes) | 5.25 | 5.0 | 5.0 | 4.75 | 3.25 | 3.25 | 2.75 | 2.5 |
| Examples | | 35 | 36 | 37 | 38 | 39 | 40 | 41 | 42 |
| Polyol Component | (Parts) | 100 | 100 | 100 | 100 | 100 | 100 | 100 | 100 |
| Polyisocyanate Component | (Parts) | 46 | 47 | 46 | 47 | 46 | 47 | 46 | 47 |
| Diazabicyclo-octane | (Part) | 0.40 | 0.40 | 0.25 | 0.25 | 0.25 | 0.25 | 0.25 | 0.25 |
| Dibutyltin-dilaurate | (Part) | 0.005 | 0.005 | 0.016 | 0.016 | 0.076 | 0.076 | 0.016 | 0.016 |
| 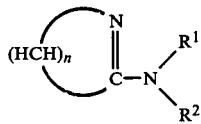 | (Part) | — | — | — | — | — | — | — | — |
| ![structure] | (Part) | — | — | — | — | — | — | — | — |
| ![structure] | (Part) | 0.10 | 0.10 | 0.10 | 0.10 | 0.04 | 0.04 | 0.1* | 0.1* |
| 'Crack-Free | (Minutes) | 4.75 | 5.0 | 4.75 | 4.75 | 4.0 | 4.0 | 3.0 | 2.75 |

The embodiments of the invention in which an exclusive privilege or property is claimed are defined as follows:

1. In a process for the preparation of molded parts of polyurethane-polyurea reacting an organic aromatic polyisocyanate, a polyol and a chain extender in the presence of a catalyst, optionally in the presence of blowing agents, auxiliaries and additives, the improvement comprising employing as catalyst a monocyclic amidine having the formula $$\text{(HCH)}_n \underset{C-N}{\overset{N}{\left\langle \right\rangle}} {\overset{R^1}{\underset{R^2}{\diagup}}}$$

wherein
R$^1$ is hydrogen or R$^2$;
n represents a whole number from 3 to 12,
R$^2$ denotes a linear or branched alkyl radical with 1 to 20 carbon atoms, a linear or branched OH—, NH$_2$—, —NH— and/or SH-group-containing alkyl radical having 1 to 20 carbon atoms, a cycloalkyl radical with 5 to 12 carbon atoms, in which one or more methylene groups may be substituted by —O—, —S—, —NH—, —CO-bridge members, a cycloalkyl radical with 5 to 12 carbon atoms substituted with linear or branched alkyl groups with 1 to 6 carbon atoms, a cyclohexyl radical, —OH—, —NH$_2$— or —SH— groups wherein one or more methylene groups can be substituted by —OH—, —S—, or —NH-members, an aromatic radical with 6 to 15 carbon atoms, an aromatic radical with 6 to 15 carbon atoms substituted with linear or branched alkyl groups with 1 to 6 carbon atoms, —OH—, —NH$_2$—, —NHCH$_3$—, —N(CH$_3$)$_2$— or —SH-groups, an aralkyl radical having 7 to 11 carbon atoms wherein the radicals R$^1$ and R$^2$ are the same or different or wherein together form a ring with 4 to 12 carbon atoms in which one or more methylene groups may be substituted by —O—, —S—, —NH—, —CO-bridge members, and which optionally contain linear or branched alkyl radicals having 1 to 6 carbon atoms, or carboxylic acid ester groups in bonded form as substituents.

2. The process according to claim 1 wherein the mixture comprises 0.001 part to 5.0 parts by weight of monocyclic amidine, 0.005 part to 5.0 parts by weight of tertiary amine (a), and 0.001 part to 2.5 parts by weight metal compound of formula (II) per 100 parts by weight polyol.

3. The process according to claim 2, wherein the mixtures of monocyclic amidines, tertiary amines (a) and metal compounds (b) of Formula (II) are used as catalyst systems.

4. The process according to claim 3, wherein the mixture comprises 0.001 part to 5.0 parts by weight of monocyclic amidine, 0.005 part to 5.0 parts by weight of tertiary amine (a), and 0.001 part to 2.5 parts by weight metal compound of Formula (II) per 100 parts by weight polyol.

5. The process according to claim 1, wherein in addition to the monocyclic amidines of Formula (I), the following are used as co-catalysts:
 (a) tertiary amines
 (b) metal compounds having the formula $$MeX_nY_m \qquad (II)$$

wherein Me denotes a (n+m) functional metal and X represents an aliphatic hydrocarbon radical with 1 to 18 carbon atoms, an aromatic hydrocarbon radical with 6 to 10 carbon atoms or an araliphatic hydrocarbon radical having 7 to 15 carbon atoms in which Y stands for a possibly olefinic=and/or alcoholic hydroxyl group-containing aliphatic carboxylate radical with 2 to 18 carbon atoms or an enolate radical with 5 to 18 carbon atoms in which, furthermore, n represents a whole number between 0 and 2, and m represents a whole number between 0 and 4 with the limitation that the total (n+m) is 2 to 4, and
 (c) olefinically unsaturated double bond and/or hydroxyl group-containing aliphatic carboxylic acids with 2 to 18 carbon atoms.

6. The process according to claim 5, wherein the monocyclic amidines of Formula (I) and the metal compounds (b) of Formula (II) or aliphatic carboxylic acids (c) are used in a mole ratio of 0.5 to 5:1.

7. The process according to claim 6 wherein the mixtures of monocyclic amidines, tertiary amines (a) and metal compounds (b) of formula (II) are used as catalyst systems.

8. The process according to any one of claims 1, 5, 6, 3 or 4, wherein the starting components are processed to molded parts by way of reaction injection molding technique.

9. The process of claim 1 wherein the organic polyisocyanate is a reaction product of dipropylene glyocl and 4,4'-diphenylmethane diisocyanate having an NCO content of 23 percent.

10. The process of claim 1 wherein the monocyclic amidine is hexahydro-1-(3,4,5,6-tetrahydro-8-H-azepine-2-yl)-1H-azepine.

* * * * *